United States Patent
Thubert et al.

(10) Patent No.: US 10,320,652 B2
(45) Date of Patent: Jun. 11, 2019

(54) DYNAMIC INSTALLATION OF BYPASS PATH BY INTERCEPTING NODE IN STORING MODE TREE-BASED NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 38 days.

(21) Appl. No.: 15/401,217

(22) Filed: Jan. 9, 2017

(65) Prior Publication Data

US 2018/0199339 A1 Jul. 12, 2018

(51) Int. Cl.
*H04L 12/24* (2006.01)
*H04L 12/44* (2006.01)
(Continued)

(52) U.S. Cl.
CPC .............. *H04L 45/02* (2013.01); *H04L 12/44* (2013.01); *H04L 41/12* (2013.01); *H04L 45/48* (2013.01); *H04L 45/14* (2013.01)

(58) Field of Classification Search
CPC ......... H04L 12/44; H04L 41/14; H04L 45/00; H04L 45/02; H04L 45/12; H04L 45/14;
(Continued)

(56) References Cited

U.S. PATENT DOCUMENTS 5,351,146 A * 9/1994 Chan ................... H04J 14/0227
370/408
6,389,432 B1 * 5/2002 Pothapragada ....... G06F 3/0605
(Continued)

FOREIGN PATENT DOCUMENTS

CN 107018057 A * 8/2017 ......... H04L 12/2852
CN 107018057 B * 10/2018 ......... H04L 12/2852
(Continued)

OTHER PUBLICATIONS

Mayzaud et al., "A Taxonomy of Attacks in RPL-based Internet or Things", International Journal of Network Security, IJNS, 2016, 18 (3), pp. 459-473.
(Continued)

*Primary Examiner* — Eric Nowlin
(74) *Attorney, Agent, or Firm* — Leon R. Turkevich

(57) ABSTRACT

In one embodiment, a method comprises promiscuously detecting, by a network device in a wireless data network having a tree-based topology for reaching a root device, a wireless data packet transmitted by a source network device and specifying a destination device in the wireless data network; determining, by the network device, that the destination device is within a first sub-topology provided by the network device to reach the root device, wherein the source network device is within a second distinct sub-topology provided by a parent device of the source network device to reach the root device; and causing installation of a bypass path, bypassing the root device, based on the network device generating and transmitting an instruction to the parent device to install a route entry causing a data packet destined for the destination device to be routed by the parent device directly to the network device.

20 Claims, 6 Drawing Sheets

(51) Int. Cl.
*H04L 12/751* (2013.01)
*H04L 12/753* (2013.01)
*H04L 12/721* (2013.01)

(58) Field of Classification Search
CPC ......... H04L 45/16; H04L 45/20; H04L 45/22; H04L 45/24; H04L 45/28; H04L 45/34; H04L 45/36; H04L 45/38; H04L 45/48; H04L 45/54; H04L 47/10; H04W 40/02; H04W 40/28; H04W 40/248; H04W 72/0446
See application file for complete search history.

(56) References Cited

U.S. PATENT DOCUMENTS

| | | | | |
|---|---|---|---|---|
| 7,020,076 B1* | 3/2006 | Alkalai | H04L 1/22 | 370/217 |
| 7,072,952 B2* | 7/2006 | Takehiro | H04L 45/00 | 370/254 |
| 7,200,869 B1* | 4/2007 | Hacherl | G06F 12/1433 | 707/999.201 |
| 7,203,743 B2* | 4/2007 | Shah-Heydari | H04L 45/02 | 709/220 |
| 7,366,111 B2* | 4/2008 | Thubert | H04L 45/48 | 370/238 |
| 7,428,221 B2 | 9/2008 | Thubert et al. | | |
| 7,539,711 B1* | 5/2009 | Pothapragada | G06F 3/0605 | |
| 7,649,884 B1* | 1/2010 | Ahmed | H04L 12/1877 | 370/254 |
| 7,656,857 B2 | 2/2010 | Thubert et al. | | |
| 7,684,355 B2* | 3/2010 | Meier | H04L 12/462 | 370/256 |
| 7,693,064 B2 | 4/2010 | Thubert et al. | | |
| 7,719,989 B2* | 5/2010 | Yau | H04L 45/00 | 370/248 |
| 7,742,399 B2* | 6/2010 | Pun | H04L 45/20 | 370/218 |
| 7,774,448 B2* | 8/2010 | Shah-Heydari | H04L 45/48 | 709/220 |
| 7,778,235 B2 | 8/2010 | Thubert et al. | | |
| 7,787,399 B2* | 8/2010 | Chu | H04L 12/462 | 370/256 |
| 7,835,378 B2* | 11/2010 | Wijnands | H04L 12/18 | 370/408 |
| 7,860,025 B2 | 12/2010 | Thubert et al. | | |
| 7,885,274 B2 | 2/2011 | Thubert | | |
| 8,046,451 B2* | 10/2011 | Shah-Heydari | H04L 45/48 | 709/220 |
| 8,090,256 B2* | 1/2012 | Reisslein | H04J 14/0227 | 398/17 |
| 8,218,550 B2* | 7/2012 | Axelsson | H04L 45/02 | 370/216 |
| 8,270,313 B2* | 9/2012 | Tao | H04L 45/18 | 370/252 |
| 8,291,263 B2* | 10/2012 | Li | G06F 11/008 | 714/26 |
| 8,385,332 B2* | 2/2013 | Aggarwal | H04L 45/02 | 370/389 |
| 8,411,691 B2* | 4/2013 | Aggarwal | H04L 45/50 | 370/389 |
| 8,432,820 B2* | 4/2013 | Liu | H04L 45/124 | 370/252 |
| 8,456,987 B1* | 6/2013 | Valluri | H04L 45/00 | 370/230 |
| 8,489,765 B2* | 7/2013 | Vasseur | H04L 45/48 | 709/238 |
| 8,630,177 B2* | 1/2014 | Vasseur | H04L 45/34 | 370/229 |
| 8,667,084 B2* | 3/2014 | Vasseur | H04L 41/145 | 709/217 |
| 8,717,943 B2* | 5/2014 | Van Wyk | H04L 45/48 | 370/254 |
| 8,724,519 B2* | 5/2014 | Sergeev | H04L 12/437 | 370/249 |
| 8,861,340 B1* | 10/2014 | Atlas | H04L 45/28 | 370/225 |
| 8,897,135 B2* | 11/2014 | Thubert | H04L 47/125 | 370/235 |
| 8,942,106 B2* | 1/2015 | Valluri | H04L 45/00 | 370/237 |
| 9,088,502 B2* | 7/2015 | Thubert | H04L 45/14 | |
| 9,100,328 B1* | 8/2015 | Atlas | H04L 45/28 | |
| 9,112,788 B2* | 8/2015 | Thubert | H04L 45/128 | |
| 9,246,794 B2* | 1/2016 | Thubert | H04L 45/18 | |
| 9,253,250 B2* | 2/2016 | Asati | H04L 67/10 | |
| 9,264,243 B2* | 2/2016 | Thubert | H04L 12/18 | |
| 9,306,764 B2* | 4/2016 | Gossain | H04L 12/2838 | |
| 9,338,086 B2* | 5/2016 | Thubert | H04L 45/507 | |
| 9,344,256 B2* | 5/2016 | Thubert | H04L 5/0067 | |
| 9,363,166 B2* | 6/2016 | Vasseur | H04L 45/34 | |
| 9,363,168 B2* | 6/2016 | Enyedi | H04L 45/16 | |
| 9,386,504 B2 | 7/2016 | Yoon | | |
| 9,391,839 B2* | 7/2016 | Phillips | H04L 41/0816 | |
| 9,413,638 B2* | 8/2016 | Thubert | H04L 45/128 | |
| 9,426,020 B2 | 8/2016 | Vasseur et al. | | |
| 9,479,421 B2* | 10/2016 | Thubert | H04L 45/025 | |
| 9,510,347 B2* | 11/2016 | Thubert | H04W 40/22 | |
| 9,519,798 B2* | 12/2016 | Egorov | G06F 21/6227 | |
| 9,596,180 B2* | 3/2017 | Thubert | H04L 45/00 | |
| 9,628,371 B2* | 4/2017 | Hui | H04L 45/28 | |
| 9,628,391 B2* | 4/2017 | Thubert | H04L 47/125 | |
| 9,716,984 B2* | 7/2017 | Purohit | H04W 4/06 | |
| 9,794,174 B2* | 10/2017 | Natu | H04L 12/2852 | |
| 9,883,507 B2* | 1/2018 | Thubert | H04W 40/22 | |
| 9,900,824 B2* | 2/2018 | Guo | H04W 24/08 | |
| 9,948,551 B2* | 4/2018 | Gossain | H04L 12/2838 | |
| 10,129,158 B2* | 11/2018 | Garg | H04L 47/122 | |
| 2003/0126299 A1* | 7/2003 | Shah-Heydari | H04L 45/02 | 709/252 |
| 2004/0255050 A1* | 12/2004 | Takehiro | H04L 45/00 | 709/252 |
| 2005/0030921 A1* | 2/2005 | Yau | H04L 45/00 | 370/329 |
| 2006/0227724 A1* | 10/2006 | Thubert | H04L 45/48 | 370/254 |
| 2006/0291496 A1* | 12/2006 | Zheng | H04L 45/46 | 370/432 |
| 2007/0082673 A1* | 4/2007 | Janneteau | H04L 45/00 | 455/445 |
| 2007/0104120 A1* | 5/2007 | Shah-Heydari | H04L 45/02 | 370/256 |
| 2008/0037477 A1* | 2/2008 | Axelsson | H04L 45/02 | 370/338 |
| 2008/0131122 A1* | 6/2008 | Reisslein | H04J 14/0227 | 398/59 |
| 2008/0232383 A1* | 9/2008 | Meier | H04L 12/462 | 370/401 |
| 2009/0323519 A1* | 12/2009 | Pun | H04L 45/20 | 370/225 |
| 2010/0020726 A1* | 1/2010 | Chu | H04L 12/462 | 370/256 |
| 2010/0074194 A1* | 3/2010 | Liu | H04L 45/124 | 370/329 |
| 2010/0177674 A1* | 7/2010 | Aggarwal | H04L 45/02 | 370/312 |
| 2010/0177685 A1* | 7/2010 | Aggarwal | H04L 45/50 | 370/328 |
| 2010/0177752 A1* | 7/2010 | Aggarwal | H04L 45/50 | 370/338 |
| 2010/0268817 A1* | 10/2010 | Shah-Heydari | H04L 45/02 | 709/224 |
| 2011/0116389 A1* | 5/2011 | Tao | H04L 45/18 | 370/252 |
| 2011/0299427 A1* | 12/2011 | Chu | H04L 12/1822 | 370/256 |
| 2012/0005533 A1* | 1/2012 | Li | G06F 11/008 | 714/26 |
| 2012/0155484 A1* | 6/2012 | Sergeev | H04L 12/437 | 370/405 |

(56) References Cited

U.S. PATENT DOCUMENTS

| | | | |
|---|---|---|---|
| 2012/0300668 A1* | 11/2012 | Thubert | H04L 45/14 370/254 |
| 2012/0307629 A1* | 12/2012 | Vasseur | H04L 45/34 370/228 |
| 2013/0094404 A1* | 4/2013 | Van Wyk | H04L 45/48 370/256 |
| 2013/0208594 A1* | 8/2013 | Thubert | H04L 47/125 370/235 |
| 2013/0223218 A1* | 8/2013 | Vasseur | H04L 45/34 370/232 |
| 2013/0227055 A1* | 8/2013 | Vasseur | H04L 41/145 709/217 |
| 2013/0258852 A1* | 10/2013 | Valluri | H04L 45/00 370/235 |
| 2013/0301470 A1* | 11/2013 | Thubert | H04L 45/128 370/254 |
| 2014/0003295 A1* | 1/2014 | Gossain | H04L 12/2838 370/256 |
| 2014/0016457 A1* | 1/2014 | Enyedi | H04L 45/16 370/225 |
| 2014/0036729 A1* | 2/2014 | Thubert | H04L 45/18 370/255 |
| 2014/0078927 A1* | 3/2014 | Thubert | H04L 45/507 370/254 |
| 2014/0098711 A1* | 4/2014 | Thubert | H04L 45/128 370/255 |
| 2014/0126423 A1 | 5/2014 | Vasseur et al. | |
| 2014/0136881 A1* | 5/2014 | Vasseur | H04L 41/145 714/4.11 |
| 2014/0233422 A1* | 8/2014 | Thubert | H04L 12/18 370/254 |
| 2014/0280711 A1* | 9/2014 | Asati | H04L 45/28 709/217 |
| 2014/0314096 A1* | 10/2014 | Hui | H04L 45/28 370/400 |
| 2014/0355425 A1* | 12/2014 | Vasseur | H04L 45/34 370/228 |
| 2015/0036507 A1* | 2/2015 | Thubert | H04L 47/125 370/237 |
| 2015/0263936 A1* | 9/2015 | Thubert | H04L 45/14 370/254 |
| 2015/0312138 A1* | 10/2015 | Thubert | H04L 45/128 370/255 |
| 2015/0327261 A1* | 11/2015 | Thubert | H04W 40/22 370/336 |
| 2015/0365285 A1* | 12/2015 | Phillips | H04L 41/0816 370/254 |
| 2016/0021006 A1 | 1/2016 | Vasseur et al. | |
| 2016/0072697 A1* | 3/2016 | Thubert | H04L 45/025 370/254 |
| 2016/0182366 A1* | 6/2016 | Gossain | H04L 12/2838 370/256 |
| 2016/0197829 A1* | 7/2016 | Thubert | H04L 45/00 370/392 |
| 2016/0218965 A1* | 7/2016 | Thubert | H04L 45/507 |
| 2016/0219414 A1* | 7/2016 | Purohit | H04W 4/06 |
| 2016/0262081 A1* | 9/2016 | Guo | H04W 24/08 |
| 2016/0269096 A1* | 9/2016 | Thubert | H04B 7/15507 |
| 2016/0294622 A1* | 10/2016 | Phillips | H04L 41/0816 |
| 2016/0308755 A1* | 10/2016 | Garg | H04L 47/122 |
| 2016/0330105 A1* | 11/2016 | Thubert | H04L 45/14 |
| 2016/0330180 A1* | 11/2016 | Egorov | G06F 21/6227 |
| 2017/0019804 A1* | 1/2017 | Morchon | H04L 45/16 |
| 2017/0048853 A1* | 2/2017 | Thubert | H04W 40/22 |
| 2017/0063685 A1* | 3/2017 | Vedantham | H04L 45/02 |
| 2017/0093703 A1* | 3/2017 | Natu | H04L 12/2852 |
| 2017/0223075 A1* | 8/2017 | Hong | G06F 8/65 |
| 2017/0249218 A1* | 8/2017 | Falkinder | G06F 16/182 |
| 2018/0146413 A1* | 5/2018 | Wetterwald | H04W 40/10 |
| 2018/0167314 A1* | 6/2018 | Kim | H04L 45/14 |
| 2018/0199339 A1* | 7/2018 | Thubert | H04L 12/44 |
| 2018/0205598 A1* | 7/2018 | Kawabata | H04W 24/04 |
| 2018/0227218 A1* | 8/2018 | Thubert | H04L 45/18 |
| 2018/0254971 A1* | 9/2018 | Thubert | H04L 49/251 |

FOREIGN PATENT DOCUMENTS

| | | | | |
|---|---|---|---|---|
| EP | 3151477 A1 * | 4/2017 | | H04L 12/2852 |
| JP | 4191135 B2 * | 12/2008 | | |
| JP | 6261001 B2 * | 1/2018 | | |

OTHER PUBLICATIONS

Winter, Ed., et al., "RPL: IPv6 Routing Protocol for Low-Power and Lossy Networks", Internet Engineering Task Force (IETF), Request for Comments: 6550, Mar. 2012, pp. 1-157.

Cisco Systems, Inc., "Cisco Connected Grid WPAN Module for CGR 1000 Series Installation and CG-Mesh Configuration Guide", [online], [retrieved on Aug. 27, 2014]. Retrieved from the Internet: <URL: http://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-46.

Ko et al., "RPL Routing Pathology in a Network With a Mix of Nodes Operating in Storing and Non-Storing Modes", [online], Feb. 12, 2014, [retrieved on Jul. 25, 2014]. Retrieved from the Internet: <URL: http://tools.ietf.org/pdf/draft-ko-roll-mix-network-pathology-04.pdf>, pp. 1-8.

Pei et al., "Fisheye State Routing: A Routing Scheme for Ad Hoc Wireless Networks", [online], Proceedings of the IEEE International Conference on Communications, New Orleans, LA, Jun. 2000, [retrieved on May 15, 2006]. Retrieved from the Internet: <URL: citeseer.ist.psu.edu/article/pei00fisheye.html>, pp. 70-74.

Vasseur, Ed. et al., "Routing Metrics Used for Path Calculation in Low-Power and Lossy Networks", Internet Engineering Task Force, Request for Comments: 6551, Mar. 2012, pp. 1-30.

Hui et al., "An IPv6 Routing Header for Source Routes with the Routing Protocol for Low-Power and Lossy Networks (RPL)", Internet Engineering Task Force, Request for Comments: 6554, Mar. 2012, pp. 1-13.

Thubert, Ed., et al., "An Architecture for IPv6 over the TSCH mode of IEEE 802.15.4e", [online], Jul. 4, 2014, [retrieved on Dec. 11, 2015]. Retrieved from the Internet: <URL: https://tools.ietf.org/html/draft-ietf-6tisch-architecture-03>, pp. 1-30.

Vasseur, "Terms Used in Routing for Low-Power and Lossy Networks" Internet Engineering Task Force, Request for Comments: 7102, Jan. 2014, pp. 1-8.

Thubert et al., U.S. Appl. No. 15/009,872, filed Jan. 29, 2016.

Wetterwald et al., U.S. Appl. No. 15/359,739, filed Nov. 23, 2016.

Thubert et al., "Root initiated routing state in RPL", [online], Dec. 7, 2016, [retrieved on Feb. 15, 2017]. Retrieved from the Internet: <URL: https://tools.ietf.org/pdf/draft-ietf-roll-dao-projection-00.pdf>, pp. 1-14.

* cited by examiner

DYNAMIC INSTALLATION OF BYPASS PATH BY INTERCEPTING NODE IN STORING MODE TREE-BASED NETWORK

TECHNICAL FIELD

The present disclosure generally relates to dynamic installation of a bypass path by an intercepting node in a storing mode tree-based network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes toward a single "root" network device in the form of a directed acyclic graph (DAG) toward the root network device, also referred to as a "DAG root", where all routes in the LLN terminate at the DAG root.

Downward routes (i.e., away from the DAG root) can be created based on Destination Advertisement Object (DAO) messages that are created by a RPL node and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing table entries for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Use of the DAG topology for routing wireless data packets between a source and a destination distinct from the DAG root, however, can result in one or more inefficient routing paths that needlessly burden the constrained resources of the RPL nodes along the inefficient routing paths.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
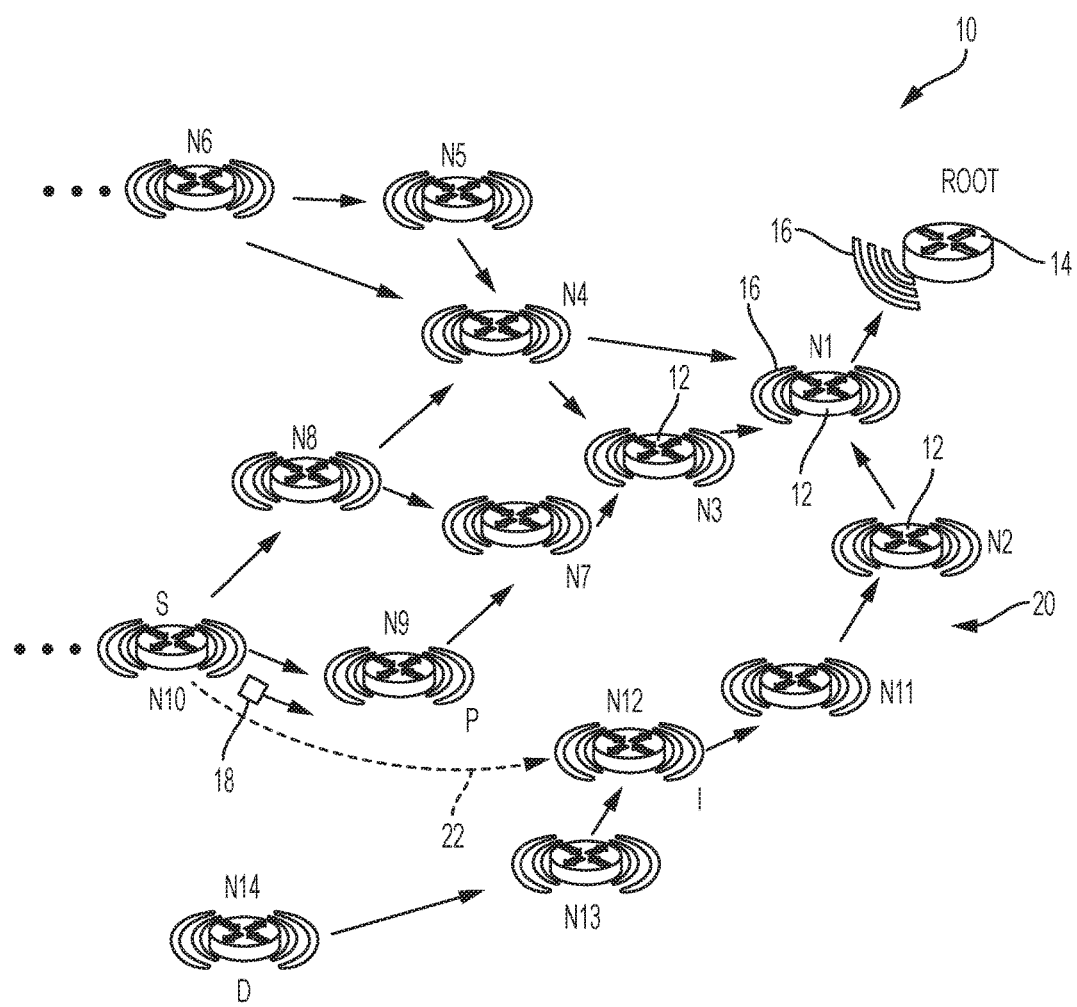
FIGS. 1A-1C illustrate an example wireless data network having an apparatus for intercepting and causing installation of a bypass path for reaching destination device in a storing mode tree-based network, according to an example embodiment.

In one embodiment, a method comprises promiscuously detecting, by a network device in a wireless data network having a tree-based topology for reaching a root device, a wireless data packet transmitted by a source network device and specifying a destination device in the wireless data network; determining, by the network device, that the destination device is within a first sub-topology provided by the network device to reach the root device, wherein the source network device is within a second distinct sub-topology provided by a parent device of the source network device to reach the root device; and causing installation of a bypass path, bypassing the root device, based on the network device generating and transmitting an instruction to the parent device to install a route entry causing a data packet destined for the destination device to be routed by the parent device directly to the network device.

In another embodiment, an apparatus comprises a device interface circuit and a processor circuit. The device interface circuit is configured for promiscuously detecting, in a wireless data network having a tree-based topology for reaching a root device, a wireless data packet transmitted by a source network device and specifying a destination device in the wireless data network. The processor circuit is configured for determining that the destination device is within a first sub-topology provided by the apparatus. The apparatus is implemented as a network device to reach the root device. The source network device is within a second distinct sub-topology provided by a parent device of the source network device to reach the root device. The processor circuit further is configured for causing installation of a bypass path, bypassing the root device, based on generating and transmitting, via the device interface circuit, an instruction to the parent device to install a route entry causing a data packet destined for the destination device to be routed by the parent device directly to the apparatus.

In another embodiment, one or more non-transitory tangible media are encoded with logic for execution by a machine and when executed by the machine operable for: promiscuously detecting, by the machine implemented as a network device in a wireless data network having a tree-based topology for reaching a root device, a wireless data packet transmitted by a source network device and specifying a destination device in the wireless data network; determining, by the network device, that the destination device is within a first sub-topology provided by the network device to reach the root device, wherein the source network device is within a second distinct sub-topology provided by a parent device of the source network device to reach the root device; and causing installation of a bypass path, bypassing the root device, based on the network device generating and transmitting an instruction to the parent device to install a route entry causing a data packet destined for the destination device to be routed by the parent device directly to the network device.

DETAILED DESCRIPTION

The Internet Engineering Task Force (IETF) has published a Request for Comments (RFC) 6550 entitled "IPv6

Routing Protocol for Low-Power and Lossy Networks", also referred to as "RPL", where a root network device can establish a directed acyclic graph (DAG) based network topology, and network devices (e.g., "RPL nodes") operating in storing mode in the network topology can store downward routing tables for their "sub-DAG" (the "child" nodes connected to the RPL node) in response to received Destination Advertisement Object (DAO) messages from child nodes.

Particular embodiments can optimize communications within a tree-based topology, such as a DAG topology, based on an intercepting network device "I" causing a parent network device "P" of a transmitting network device "S" to install a bypass path for reaching a destination "D" via the intercepting network device "I" as opposed to any default path used by the parent network device "P" in the tree-based topology. The bypass path enables the parent network device "P" 12 to bypass any common parent between the parent network device "P" and the intercepting network device "I", regardless of rank, for optimized routing to the destination "D" attached within a sub-DAG topology of the intercepting network device "I".

FIG. 1A is an example data network 10 comprising a plurality of network devices 12, where any one network device 12 can install a bypass path for optimizing reachability to a destination device, according to an example embodiment. The data network 10 can comprise network devices (e.g., "N1 through "N14") 12 attached to at least one of another network device 12 or a root network device "ROOT" 14 via wireless data links 16 that form a link layer mesh topology. Although only the network devices "N1", "N2", and "N3" are labeled with the reference numeral "12" in FIGS. 1A-1C to avoid cluttering in the Figures, it should be apparent that all the network devices "N1" through "N14" are allocated the reference numeral "12" for purposes of the description herein. Further, it should be apparent that all the network devices "N1" through "N14" 12 can be configured for establishing wireless data links 16 (illustrated as curved lines radiating from each device 12 or 14), even though only the wireless data links for the network device "N1" 12 and the root network device 14 are labeled with the reference numeral "16" to avoid cluttering in the Figures. Any one of the network devices 12 also can be connected to one or more root network devices 14, for example where a plurality of root network devices can be connected via a wired data link to form a "backbone" network for the data network 10.

Conventional approaches to generating a tree-based topology 20 overlying the link layer mesh topology, for example a destination-oriented directed acyclic graph (DODAG) topology 20, assume that the root network device 14 outputs a routing advertisement message (e.g., a RPL DIO message according to RFC 6550, etc.) (not shown) that specifies the Objective Function (OF) to be used by network devices (e.g., RPL nodes implemented according to RFC 6550) 12 in evaluating whether to attach to the root network device 14 or other neighboring network devices 12. The objective function specified in the routing advertisement message (e.g., an Objective Code Point (OCP) value according to RFC 6550) defines how network devices 12 select and optimize routes within the DODAG topology according to the objective function specified by the root network device 14. Hence, the RPL nodes 12 can form the tree-based DODAG topology 20 of FIG. 1A based on the objective function specified by the root network device 14.

A child network device 12 (e.g., "N10") also can unicast a DAO message to its parent network device (e.g., "N9"), as described above, enabling the parent network device in storing mode to store a downward route entry indicating that the child network device is reachable via an identifiable interface of the parent network device; hence, the hop-by-hop propagation of DAO messages toward the root network device 14 enables each parent network device to install a downward route entry for reaching child network devices "below" the parent network device in its corresponding sub-DAG. As used herein "up" or "upstream" refers to a direction toward the root network device 14, and "above" refers to an "upward" relative position that is toward the root network device 14; conversely, "down" or "downstream" refers to a direction away from the root network device 14 (i.e., toward one or more leaf nodes in the DODAG topology 20), and "below" refers to a "downward" relative position that is away from the root network device 14. For example, network device "N1" 12 is above network devices "N2" through "N14" and sends data packets downward to network devices "N2", "N3", or "N4" (in the direction opposite the illustrated arrows), and leaf network device "N10" is below network devices "N8" and "N9" and sends data packets upward (in the same direction as the illustrated arrows) to the network devices "N8" and "N9".

Although the DODAG topology 20 provides optimized connections for network devices 12 to reach the root network device 14 according to the objective function chosen by the root network device 14, the DODAG topology may be sub-optimal for network traffic between different network devices 12 in the DODAG topology 20, for example between a source network device "S" (e.g., "N10") 12 and a destination network device "D" (e.g. "N14"). As illustrated in FIG. 1A, the best available default route in the DODAG topology 20 for a data packet transmitted from the source network device "S" 12 to the destination network device "D", starting with the parent network device "P" (e.g., "N9") 12 of the source network device "S" 12 and passing via the common parent network device "N1", is the nine (9)-hop sequence of "P" ("N9")-"N7"-"N3"-"N1"-"N2"-"N11"-"N12"-"N13"-"D" ("N14"). Hence, the DODAG topology 20 can result in poor performance for ad-hoc data flows between a source network device and a destination network device in the wireless data network 10.

According to example embodiments, a network device referred to herein as an intercepting device "I" (e.g., "N12" of FIGS. 1A-1C) 12 can be configured for promiscuously detecting an upwardly-propagating wireless data packet 18 that is transmitted (e.g., unicast) by a source network device "S" (e.g., "N10") 12 to its parent network device "P" (e.g., "N9") 12, where the wireless data packet 18 specifies a destination device "D" (e.g., "N14") in the wireless data network 10. In response to the intercepting device "I" 12 promiscuously detecting the wireless data packet 18 (indicated by the dashed line 22 in FIG. 1A) destined for a destination device "D" 12 within its sub-topology (e.g., within the sub-DAG of the intercepting device "I" 12), the intercepting device "I" can generate and output a data packet (24 of FIG. 1B) that includes an instruction that causes the parent network device "P" 12 to install a route entry for a bypass path (26 of FIG. 1C) that bypasses the default parent (e.g., "N7") (and the root network device 14) of the parent network device "P" 12. The data packet 24 generated by the intercepting network device "I" 12 and carrying the instruction for the parent network device "P" 12 can be implemented, for example, as a cut-through limited (CTL) destination advertisement object (DAO) message ("CTL-DAO") as an extension to existing DAO messages as specified in RFC 6550; the CTL-DAO message 24 sent to the parent network device "P" 12 can specify that the destination device "D" (e.g., "N14") is reachable via the intercepting network device "I" (e.g., "N12") 12.

Hence, the parent network device "P" 12 operating in storing mode can respond to the CTL-DAO message 24 by creating an internal route entry (also referred to herein as a bypass route entry) specifying that the destination "D" (e.g., "N14") is reachable via the intercepting network device "I" (e.g., "N12") 12, enabling the parent network device "P" 12 to reroute a received data packet (30 of FIG. 1C) along the bypass path 26 for next-hop forwarding to the intercepting network device "I" 12. Hence the intercepting network device "I" 12 can forward the rerouted data packet 30 within its sub-DAG based on its stored downward route entry for reaching the destination device "D" 12 via its child network device "N13" 12 for delivery of the rerouted data packet 30 by the child network device "N13" to its child network device "N14" 12 as the intended destination of the rerouted data packet 30 along optimized source-destination route 28 established based on the bypass path 26. As apparent from the foregoing, the network device "N13" 12 can generate a stored downward route entry for reaching the destination device "N14" 12 based on a previously-received DAO message from the destination device "N14", and the intercepting network device "I" 12 can create a stored downward route entry for reaching the destination device "N14" based on a previously-received DAO message from the network device "N13" 12 specifying the destination device "N14" 12 is reachable via the network device "N13" 12.

Hence, the generation and transmission of the CTL-DAO message 24 (requesting installation of a bypass route entry for the bypass path 26 for the destination device "D" 12) by the intercepting network device "I" 12 in response to the promiscuous detection 22 of the wireless data packet 18 enables the parent network device "P" 12 to install the bypass path 26 for direct transmission of the rerouted data packet 30 to the intercepting network device "I" 12 along the optimized source-destination route 28, enabling bypassing of the default parent "N7" 12 of the parent network device "P" 12, as well as bypassing any other comment parent network devices such as the network device "N1" 12, one or more root network devices 14, etc. Hence, the rerouted data packet 30 can reach the destination network device "D" 12 without burdening the constrained resources of the network devices along the default path in the storing mode topology, namely the devices "N7", "N3", "N1" "N2", "N11", or the root network device 14, resulting in the conserved energy in the bypassed network devices.

Hence, the example embodiments enable the intercepting network device "I" 12 to create an optimized source-destination route 28 in a storing-mode wireless data network, on an ad hoc basis for at least a temporary time interval, without the necessity of inserting a source-route header into the data packet. The parent network device "P" 12 can install the bypass route entry for the bypass path 26 on a temporary basis, for example based on a temporary time interval specified by the intercepting network device "I" 12 in the CTL-DAO message 24, a determined lack of data flows between the source network device "S" and the destination network device "D" for a prescribed interval (e.g., a timeout interval) specified in the CTL-DAO message 24 and/or set in the parent, etc. The intercepting network device "I" 12 also can send an updated instruction to the parent network device "P" 12 to delete the bypass route entry in response to the intercepting network device "I" 12 detecting an identifiable level of inactivity in the data flow between the source network device "S" and the destination network device "D".

Hence, the example embodiments enable localized optimization for at least a temporary time interval based on an ad hoc initiation of a data flow between the source network device "S" and the destination network device "D".

Figure 1B:
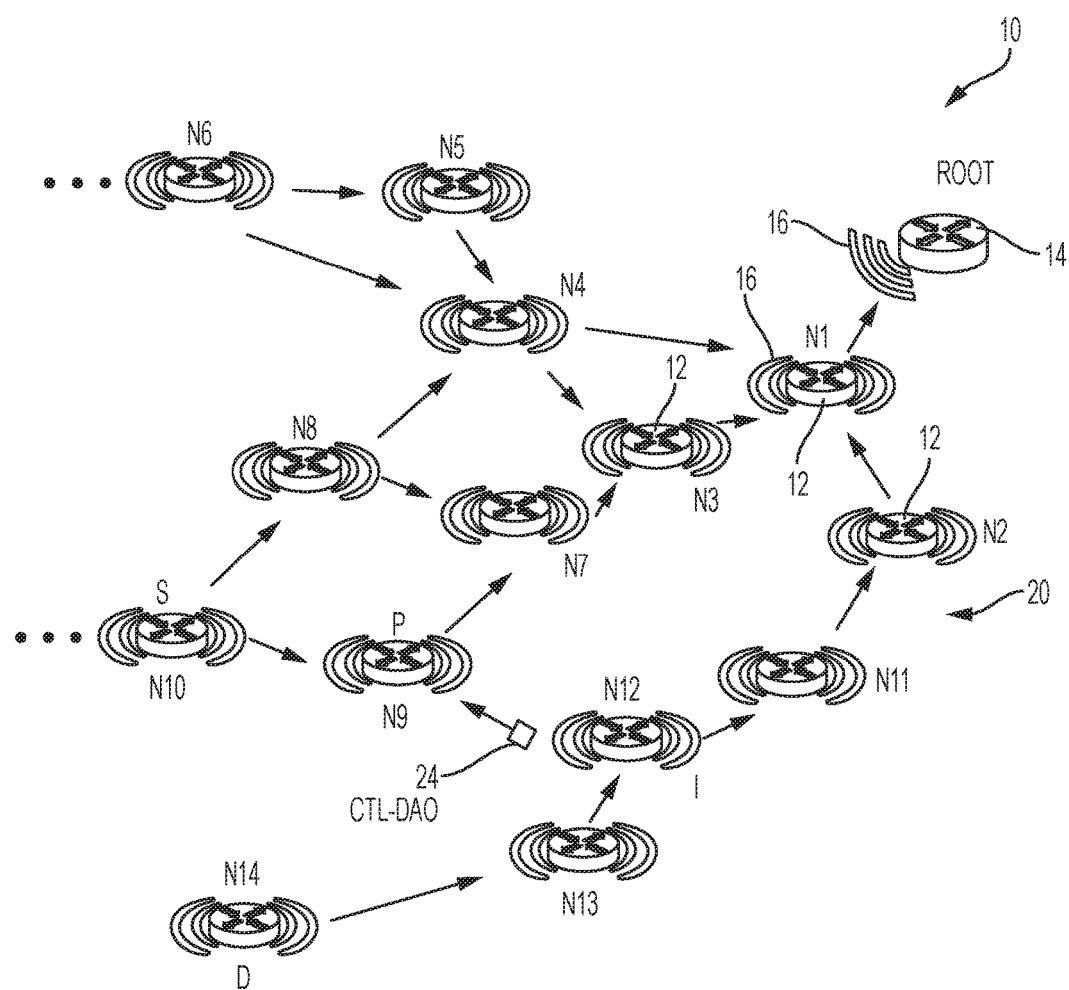
Figure 1C:
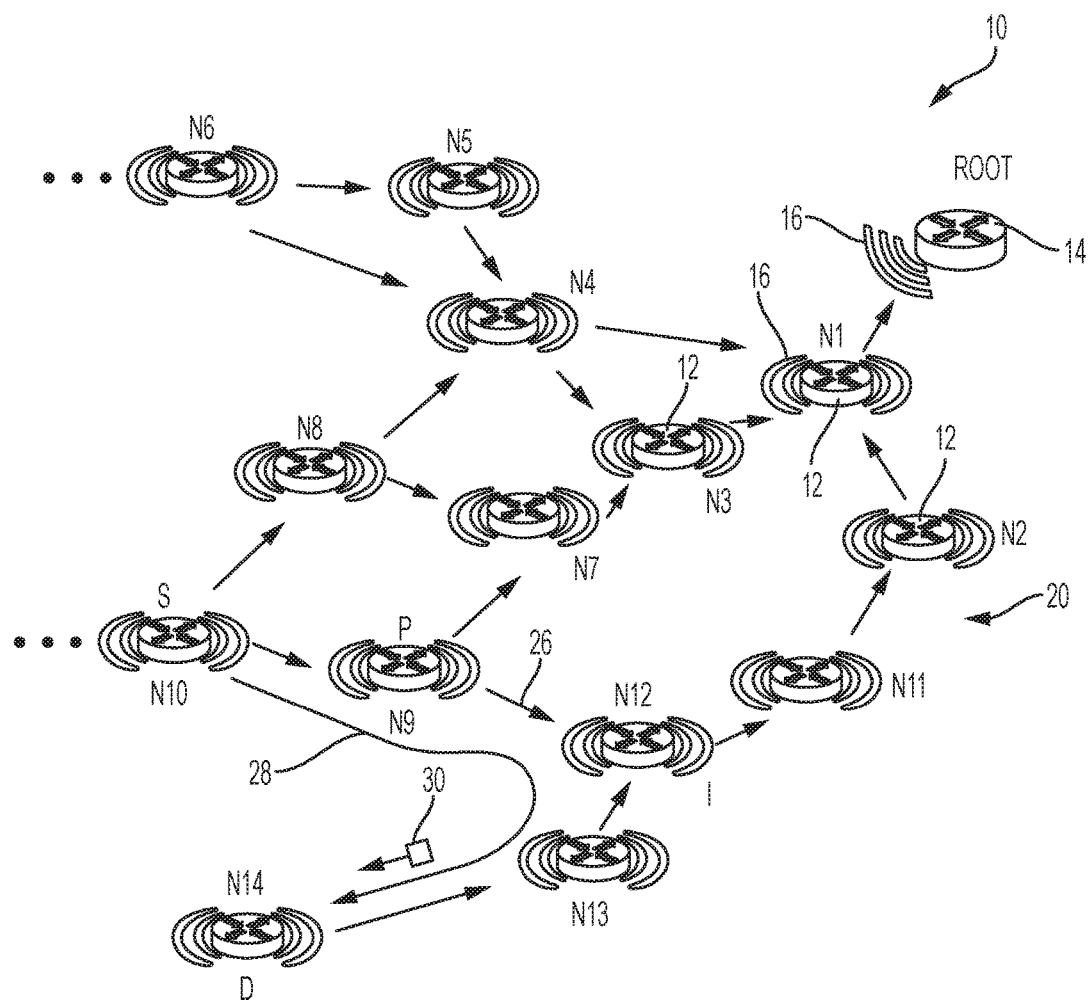
Figure 2:
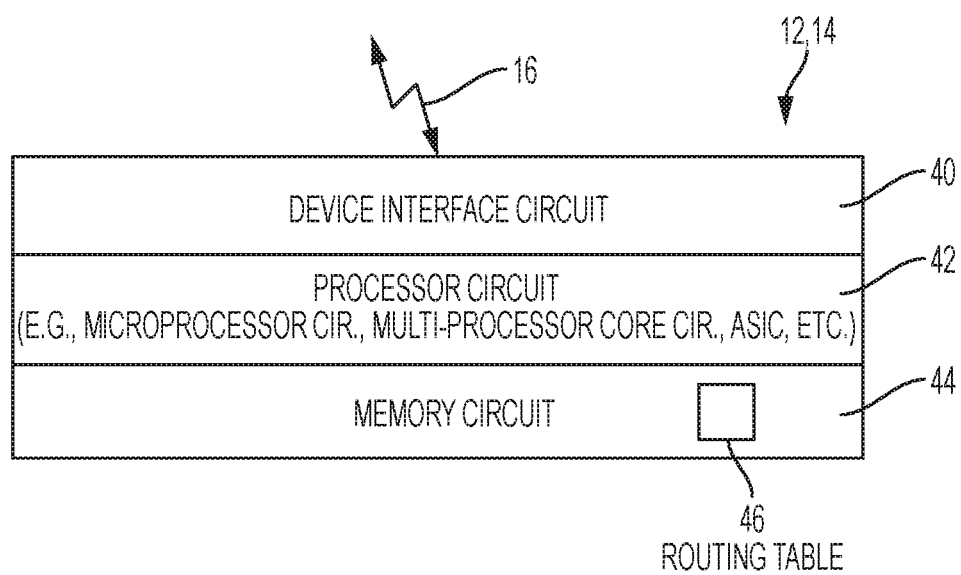
FIG. 2 illustrates an example implementation of any one of the network devices of FIGS. 1A-1C.

FIG. 2 illustrates an example implementation of any one of the network devices 12 and/or 14 of FIG. 1, according to an example embodiment. Each apparatus 12 and/or 14 is a physical machine (i.e., a hardware device) configured for implementing network communications with other physical machines 12 and/or 14 via the network 10. The term "configured for" or "configured to" as used herein with respect to a specified operation refers to a device and/or machine that is physically constructed and arranged to perform the specified operation. Hence, the apparatus 12 and/or 14 is a network-enabled machine implementing network communications with other machines 12 and/or 14 via the network 10.

Each apparatus 12 and/or 14 can include a device interface circuit 40, a processor circuit 42, and a memory circuit 44. The device interface circuit 40 can include one or more distinct physical layer transceivers for communication with any one of the other devices 12 and/or 14; the device interface circuit 40 also can include an IEEE based Ethernet transceiver for communications with the devices of FIG. 1 via any type of data link (e.g., a wired data link, a wireless data link 16, an optical link, etc.). The processor circuit 42 can be configured for executing any of the operations described herein, and the memory circuit 44 can be configured for storing any data structure or data packets as described herein, including a routing table 46 configured for storing route entries, for example downward route entries, bypass route entries, a default router list identifying one or more available parent network devices, etc.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
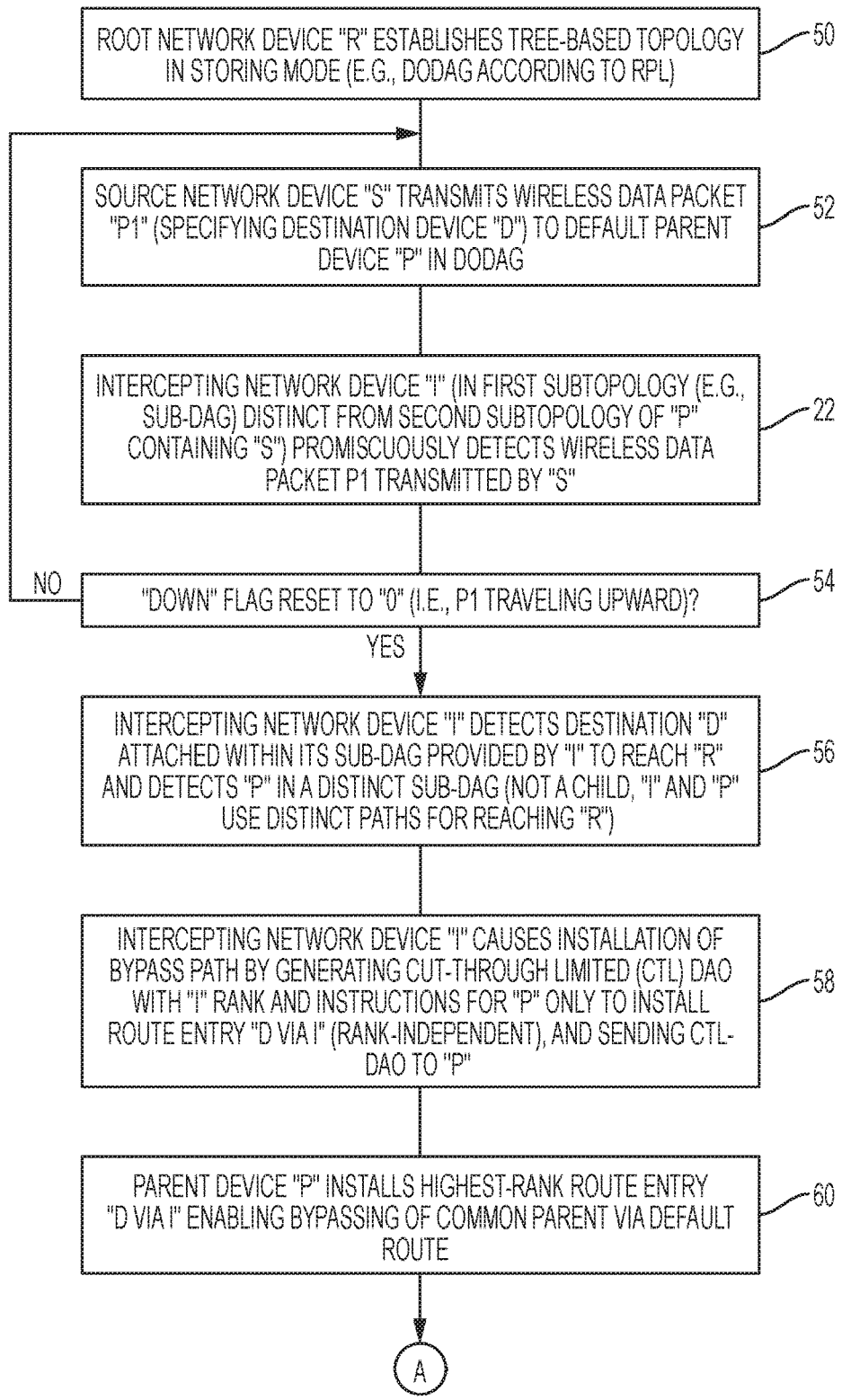
FIGS. 3A-3B illustrate an example method, by the apparatus of FIG. 1, of causing installation of a bypass path for reaching a destination device in a storing mode tree-based network, according to an example embodiment.
Figure 3B:
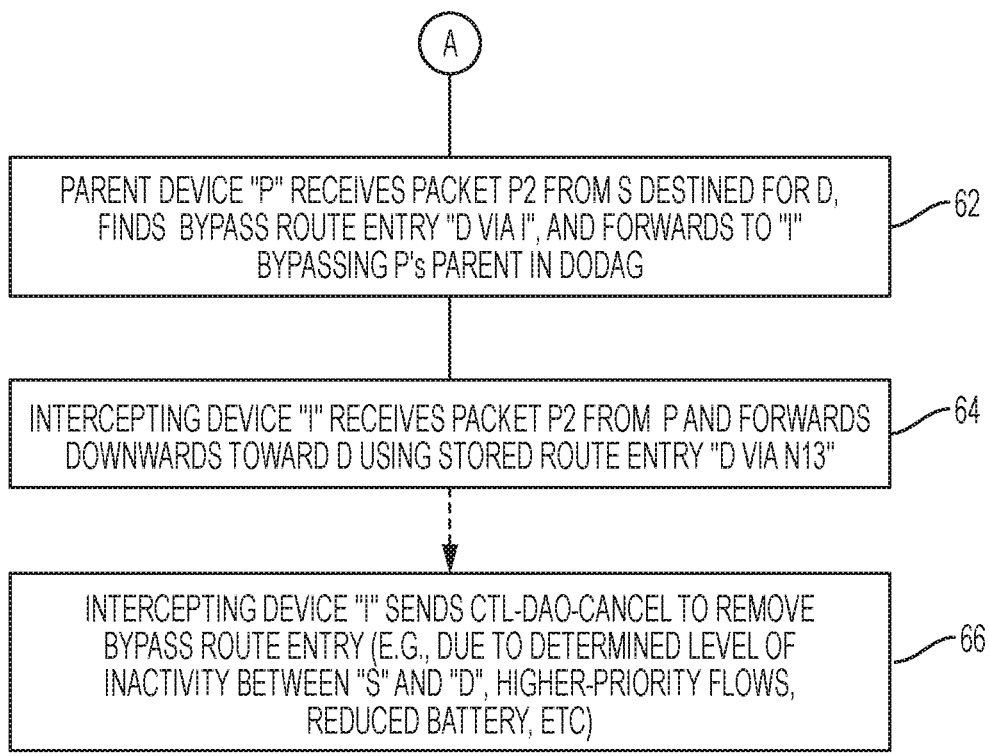

FIGS. 3A-3B illustrate an example method, by the apparatus of FIG. 1, of causing installation of a bypass path for reaching a destination device in a storing mode tree-based network, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, the processor circuit 42 of the root network device 14 is configured for establishing in operation 50 the tree-based DODAG topology 20 in storing mode, for example based on outputting DIO messages according to RFC 6550 to generate a DODAG according to RPL. Each network device 12, in response to attaching to a parent network device 12 and/or 14 in the tree-based DODAG topology 20, can generate and unicast output a DAO message according to RFC 6550, enabling each parent network device to create in its corresponding routing table 46 a downward route entry for reaching the network device based on the received DAO. Hence, the downstream transmission of DIO messages initiated by the root network device 14 in operation 50, and the DAO messages transmitted upstream by the attached network devices 12, establish the non-storing mode of the tree-based DODAG topology 20 illustrated in FIG. 1A.

The source network device "S" (e.g., "N10") of FIG. 1A in operation 52 can transmit a wireless data packet 18 that identifies its default next-hop parent network device "P" (e.g., "N9") as the target of the wireless data packet 18, and that identifies the destination network device "D" (e.g., "N14") as the final destination of the wireless data packet 18. In response to receiving the wireless data packet 18, the processor circuit 42 of the parent network device "P" (e.g., "N9") can determine from its routing table 46 that the wireless data packet 18 should be forwarded upward along the default route toward the root network device 14 via its parent network device "N7"; as apparent from the foregoing, the wireless data packet 18 is forwarded upstream until reaching the common parent "N1" 12 that stores within its routing table 46 a downward route entry for reaching the destination network device "D" (e.g., "N14") via an attached child network device (e.g., "N2").

According to an example embodiment, the device interface circuit 40 of the intercepting network device "I" 12 is configured for promiscuously detecting in operation 22 of FIGS. 1A and 3A the wireless data packet 18 transmitted by the source network device "S" 12, the wireless data packet 18 identifying the source network device "S" (e.g., "N10") 12, the next-hop parent network device "P" (e.g., "N9"), and the destination network device "D" (e.g., "N14") 12. As illustrated in FIGS. 1A-1C, the intercepting network device "I" 12 provides a sub-topology (e.g., sub-DAG) containing the destination network device "D" (e.g., "N14") 12 and that is distinct from the sub-topology (e.g., sub-DAG) provided by the parent network device "P" 12 and containing the source network device "S" 12; in other words, the intercepting network device "I" 12 does not share any data link with the parent network device "P" (e.g., "N9") or with its corresponding parent network device "N7" that would enable the intercepting network device "I" 12 to receive the wireless data packet 18 along its default upward path of "S"-"N9"-"N7"-"N3"-"N1". Hence, the destination network device "D" (e.g., "N14") is within a first sub-topology (comprising network device "N13") provided by the intercepting network device "I" 12 to reach the root network device 14 (via its parent "N11", etc.), and the source network device "S" 12 is within a second distinct (i.e., non-overlapping) sub-topology provided by the parent network device "P" 12 to reach the root network device 14 (via its parent "N7", etc.).

Although the example embodiments illustrate the source network device "S" as a leaf node (e.g., "N10") having originated the data packet, the source network device "S" also could be a forwarding node that is the first wireless network device within transmission range of the intercepting network device "I" 12.

In response to the device interface circuit 40 of the intercepting network device "I" 12 promiscuously detecting in operation 22 the wireless data packet 18 transmitted by the source network device "S" 12 and identifying the next-hop parent network device "P" 12 and the destination device "D" (e.g., "N14") 12, the processor circuit 42 of the intercepting network device "I" 12 can determine in operation 54 whether the wireless data packet (e.g., "P1") 18 is traveling upward toward the root network device 14, for example based determining whether a downward flag is reset to zero in the wireless data packet 18 (e.g., according to Section 11.2 of RFC 6550). If the processor circuit 42 of the intercepting network device "I" 12 determining the downward flag is not reset to zero, indicating the wireless data packet 18 is traveling downward, the processor circuit 42 of the intercepting network device "I" 12 drops the promiscuously-detected data packet that is already traveling downward.

In response to the processor circuit 42 of the intercepting network device "I" 12 determining in operation 54 that the wireless data packet 18 is traveling upward, the processor circuit 42 of the intercepting network device "I" 12 in operation 56 can determine from its routing table 46 that the destination device "D" (e.g., "N14") is within its sub-topology via its child network device "N13" 12. As described previously, the routing table 46 of the intercepting network device "I" 12 can identify all children (e.g., "N13", "N14") within its sub-DAG based on the received DAO messages from its attached children. The processor circuit 42 of the intercepting network device "I" 12 also can determine from its routing table 46 in operation 56 that the parent network device "P" (e.g., "N9") and the source network device "S" (e.g., "N10") are not within its sub-topology based on a determined absence of any route entry in its processor circuit 42 for either the parent network device "P" (e.g., "N9") or the source network device "S" (e.g., "N10"). Consequently, the processor circuit 42 of the intercepting network device "I" 12 in operation 56 can determine that the parent network device "P" (e.g., "N9") and the source network device "S" (e.g., "N10") are in a distinct (i.e., non-overlapping) sub-topology.

The processor circuit 42 of the intercepting network device "I" 12 in operation 58 can cause installation of a bypass path 26 that bypasses the default parent "N7" and the root network device 14 (and the common parent "N1") based on the processor circuit 42 of the intercepting network device "I" 12 generating and transmitting to the parent network device "P" 12 a CTL-DAO message 24 specifying an instruction to install into its corresponding routing table 46 a bypass route entry that causes any data packet (e.g., 30 of FIG. 1C) destined for the destination network device "D" (e.g., "N14") to be routed by the parent network device "P" 12 directly to the intercepting network device "I" 12 via the bypass path 26, instead of the default route used by the parent network device "P" 12. As described previously, the device interface circuit 40 of the intercepting network device "I" 12 executes a unicast transmission of the CTL-DAO message 24 only to the parent network device "P" 12, such that the CTL-DAO message 24 is executed only by the parent network device "P" 12 and no other network device 12; in other words, the CTL-DAO message 24 is not forwarded to any other network device 12, but is executed only by the intended target, namely the parent network device "P" 12.

Also note that the CTL-DAO message 24 is sent by the intercepting network device "I" 12 to the parent network device "P" 12 independent of any relative rank values between the intercepting network device "I" 12 and the parent network device "P" 12, e.g., regardless of the respective ranks (e.g., number of hops or depth) relative to the root network device 14. Nevertheless, the CTL-DAO message 24 can specify a rank value of the intercepting network device "I" 12 in the event the parent network device "P" 12 receives another CTL-DAO message from another network device (e.g., from network device "N11"), enabling the parent network device "P" 12 to select between the intercepting network device "I" 12 and any other network device (e.g., "N11") having promiscuously detected the wireless data packet, based on the corresponding rank.

In response to the device interface circuit 40 of the parent network device "P" 12 receiving in operation 60 the CTL-DAO message 24 from the intercepting network device "I" 12 (and for example from the network device "N11"), the processor circuit 42 of the parent network device "P" 12 in operation 60 can install in its routing table 46 the highest-ranking bypass route entry (i.e., closest to the destination network device "N14" 12) specifying the bypass route "D via I" (or "N14 via N12", and/or its IPv6 address equivalent, etc.) for implementing the bypass path 26. Hence, in response to the parent network device "P" receiving in operation 62 of FIG. 3B another data packet "P2" (30 of FIG. 1C) destined for the destination device "D" (e.g., "N14"), the processor circuit 42 of the parent network device "P" 12 can reroute the rerouted data packet 30 directly to the intercepting network device "I" 12 via the bypass path 26, enabling the processor circuit 42 of the intercepting network device "I" 12 in operation 64 to forward the rerouted data packet 30 to the destination network device "D" 12 via its child network device "N13" based on its downward route entry specifying the destination network device "N14" 12 is reachable via the child network device "N13".

Hence, the rerouting of the rerouted data packet 30 along the optimized source-destination route 28 via the bypass path 26 enables the parent network device "P" 12 to bypass the default route via its parent network device "N7", bypass the common parent device "N1" 12 of the parent network device "P" and the intercepting network device "I" 12, and bypass the root network device 14.

As described previously, the bypass route entry could be added on a temporary basis based on, for example, the presence of data flows between the source network device "S" and the destination network device "D", etc. Hence, the processor circuit 42 of the intercepting network device "I" 12 in operation 66 can send a second instruction (e.g., a CTL-DAO-CANCEL message), to the parent network device "P" 12, for removal of the bypass route entry based on the processor circuit 42 of the intercepting network device "I" detecting a determined level of inactivity between the source network device "S" 12 and the destination network device "D" 12, or if the bypass route entry needs to be deleted to conserve constrained resources for a higher-priority data flow, etc.

The parent network device "P" 12 in response can remove the bypass route entry from its routing table 46 in response to the second instruction (e.g., based on a determined absence of activity in the data flow between the source network device "S" and the destination network device "D", higher-priority data flows, constrained resources, etc.). Hence, the bypass route entry enables localized optimization, at least on a temporary basis, for optimized transmission between the source network device "S" and the destination network device "D".

According to example embodiments, unnecessary transmissions of a wireless data packet can be minimized based on an intercepting network device initiating at least temporary installation of a bypass route entry in a parent network device located in a distinct sub-topology, enabling rerouting of a wireless data packet along an optimized route that enables one or more "upstream" network device transmissions to be bypassed. The example embodiments improve efficiency by minimizing power consumption in an LLN network, based on minimizing unnecessary power consumption.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

promiscuously detecting, by a network device in a wireless data network having a tree-based topology for reaching a root device, a wireless data packet transmitted by a source network device and specifying a destination device in the wireless data network;

determining, by the network device, that the destination device is within a first sub-topology provided by the network device to reach the root device, wherein the source network device is within a second distinct sub-topology provided by a parent device of the source network device to reach the root device; and the network device causing installation of a bypass path, bypassing the root device, based on the network device generating and transmitting an instruction to the parent device to install a route entry causing a second data packet destined for the destination device to be routed by the parent device directly to the network device, wherein the network device is not the root device.

2. The method of claim 1, further comprising detecting the wireless data packet is traveling upward toward the root device based on a downward flag reset in the wireless data packet, the causing installation based on the detecting that the wireless data packet is traveling upward.

3. The method of claim 1, wherein the causing installation includes the network device sending the instruction independent of any relative rank values between the network device and the parent device of the source network device.

4. The method of claim 1, wherein the instruction causes the second data packet to bypass the root device and a common parent device shared by the network device and the parent device.

5. The method of claim 1, wherein the instruction specifies a rank value of the network device, enabling the parent device to select between the network device and any other network device having promiscuously detected the wireless data packet, based on the corresponding rank.

6. The method of claim 5, wherein the instruction is specified within a Destination Advertisement Object (DAO) message identified as limited to execution only by the parent device receiving the DAO message.

7. The method of claim 1, further comprising the network device sending a second instruction, to the parent device, for removal of the route entry based on a determined level of inactivity between the source network device and the destination device.

8. An apparatus comprising:

a device interface circuit configured for promiscuously detecting, in a wireless data network having a tree-based topology for reaching a root device, a wireless data packet transmitted by a source network device and specifying a destination device in the wireless data network; and a processor circuit configured for determining that the destination device is within a first sub-topology provided by the apparatus, the apparatus implemented as a network device to reach the root device, wherein the source network device is within a second distinct sub-topology provided by a parent device of the source network device to reach the root device;

the processor circuit further configured for causing installation of a bypass path, bypassing the root device, based on generating and transmitting, via the device interface circuit, an instruction to the parent device to install a route entry causing a second data packet destined for the destination device to be routed by the parent device directly to the apparatus, wherein the apparatus implemented as the network device is not the root device.

9. The apparatus of claim 8, wherein the processor circuit is configured for causing the installation in response to detecting the wireless data packet is traveling upward toward the root device based on a downward flag reset in the wireless data packet.

10. The apparatus of claim 8, wherein the processor circuit is configured for sending the instruction independent of any relative rank values between the apparatus and the parent device of the source network device.

11. The apparatus of claim 8, wherein the instruction causes the second data packet to bypass the root device and a common parent device shared by the apparatus and the parent device.

12. The apparatus of claim 8, wherein the instruction specifies a rank value of the apparatus, enabling the parent device to select between the apparatus and any other network device having promiscuously detected the wireless data packet, based on the corresponding rank.

13. The apparatus of claim 12, wherein the instruction is specified within a Destination Advertisement Object (DAO) message identified as limited to execution only by the parent device receiving the DAO message.

14. The apparatus of claim 8, wherein the processor circuit is configured for sending a second instruction, to the parent device, for removal of the route entry based on a determined level of inactivity between the source network device and the destination device.

15. One or more non-transitory tangible media encoded with logic for execution by a machine and when executed by the machine operable for:

promiscuously detecting, by the machine implemented as a network device in a wireless data network having a tree-based topology for reaching a root device, a wireless data packet transmitted by a source network device and specifying a destination device in the wireless data network;

determining, by the network device, that the destination device is within a first sub-topology provided by the network device to reach the root device, wherein the source network device is within a second distinct sub-topology provided by a parent device of the source network device to reach the root device; and causing installation of a bypass path, bypassing the root device, based on the network device generating and transmitting an instruction to the parent device to install a route entry causing a second data packet destined for the destination device to be routed by the parent device directly to the network device, wherein the network device is not the root device.

16. The one or more non-transitory tangible media of claim 15, further operable for detecting the wireless data packet is traveling upward toward the root device based on a downward flag reset in the wireless data packet, the causing installation based on the detecting that the wireless data packet is traveling upward.

17. The one or more non-transitory tangible media of claim 15, wherein the causing installation includes the network device sending the instruction independent of any relative rank values between the network device and the parent device of the source network device.

18. The one or more non-transitory tangible media of claim 15, wherein the instruction causes the second data packet to bypass the root device and a common parent device shared by the network device and the parent device.

19. The one or more non-transitory tangible media of claim 15, wherein the instruction specifies a rank value of the network device, enabling the parent device to select between the network device and any other network device having promiscuously detected the wireless data packet, based on the corresponding rank.

20. The one or more non-transitory tangible media of claim 15, further operable for sending a second instruction, to the parent device, for removal of the route entry based on a determined level of inactivity between the source network device and the destination device.

* * * * *